(12) United States Patent
Nakamura (10) Patent No.: US 9,294,925 B2
(45) Date of Patent: Mar. 22, 2016

(54) LOW POWER BASE STATION AND COMMUNICATION CONTROL METHOD

(75) Inventor: Kazutaka Nakamura, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 738 days.

(21) Appl. No.: 13/637,951

(22) PCT Filed: Mar. 28, 2011

(86) PCT No.: PCT/JP2011/057597
§ 371 (c)(1),
(2), (4) Date: Sep. 27, 2012

(87) PCT Pub. No.: WO2011/122542
PCT Pub. Date: Oct. 6, 2011

(65) Prior Publication Data
US 2013/0029710 A1    Jan. 31, 2013

(30) Foreign Application Priority Data

Mar. 29, 2010    (JP) ................ 2010-074955

(51) Int. Cl.
| | | |
|---|---|---|
| H04W 72/00 | (2009.01) | |
| H04W 16/10 | (2009.01) | |
| H04W 72/04 | (2009.01) | |
| H04W 72/08 | (2009.01) | |

(52) U.S. Cl.
CPC .......... *H04W 16/10* (2013.01); *H04W 72/0453* (2013.01); *H04W 72/082* (2013.01)

(58) Field of Classification Search
CPC . H04W 84/045; H04W 24/02; H04W 72/082; H04W 16/32; H04W 24/08; H04W 64/00; H04W 36/30; H04L 5/0032; H04L 5/0073; H04B 1/715
USPC ............ 455/450, 69, 444, 452.1, 452.2, 522, 455/561; 370/252, 328, 329, 335
See application file for complete search history.

(56) References Cited

U.S. PATENT DOCUMENTS

| | | | |
|---|---|---|---|
| 6,453,166 B1 * | 9/2002 | Ishikawa et al. | ............... 455/450 |
| 2004/0005906 A1 | 1/2004 | Okumura et al. | |
| 2007/0129096 A1 | 6/2007 | Okumura et al. | |
| 2007/0270151 A1 * | 11/2007 | Claussen et al. | ............... 455/444 |
| 2009/0318182 A1 * | 12/2009 | Nagato et al. | ................. 455/522 |

(Continued)

FOREIGN PATENT DOCUMENTS

| | | |
|---|---|---|
| JP | 2010-004187 A | 1/2010 |
| KR | 10-2006-0007461 A | 1/2006 |

OTHER PUBLICATIONS

An Office Action issued by the Chinese Patent Office on Aug. 21, 2014, which corresponds to Chinese Patent Application No. 201180017402.7 and is related to U.S. Appl. No. 13/637,951; with English language concise explanation.

(Continued)

*Primary Examiner* — Shaima Q Aminzay
(74) *Attorney, Agent, or Firm* — Studebaker & Brackett PC (57) ABSTRACT

Disclosed is a low power base station (300) which acquires propagation loss information indicating the propagation loss between the low power base station (300) and a high power base station (100). The low power base station (300) restricts the frequency band allocated to a femtocell terminal (400) under the low power base station (300) on the basis of the propagation loss indicated in the acquired propagation loss information.

5 Claims, 5 Drawing Sheets

(56) References Cited

U.S. PATENT DOCUMENTS

2010/0087203 A1* 4/2010 Lee et al. ............... 455/452.2
2010/0124930 A1* 5/2010 Andrews et al. ........... 455/436
2011/0013568 A1* 1/2011 Yim et al. ................ 370/329
2012/0329470 A1* 12/2012 Nakamura .............. 455/452.1

OTHER PUBLICATIONS

Kyocera; "Pathloss-difference-based uplink interference mitigation scheme in HeNB deployment"; TSG-RAN Working Group 4 (Radio) meeting #52; R4-092694; Aug. 24-28, 2009; pp. 1-6; Shenzhen, P. R. China.
An Office Action issued by the Korean Patent Office on Dec. 2, 2013, which corresponds to Korean Patent Application No. 10-2012-7026861 and is related to U.S. Appl. No. 13/637,951; with English language statement of relevance.
3GPP TR 25.967 8.0.1(Mar. 2009); 3rd Generation Partnership Project; Technical Specification Group Access Networks; Home Node B Radio Frequency (RF) Requirements (FDD)(Release 8).
International Search Report; PCT/JP2011/057597; May 17, 2011.

* cited by examiner

LOW POWER BASE STATION AND COMMUNICATION CONTROL METHOD

TECHNICAL FIELD

The present invention relates to a low power base station that constitutes a radio communication system together with a high power base station and has transmission output smaller than transmission output of the high power base station, and a communication control method in the low power base station.

BACKGROUND ART

As the next-generation radio communication system for achieving higher speed communication with higher capacity, as compared with the 3rd-generation and 3.5th-generation radio communication systems operated at present, an LTE has been standardized by 3GPP, which is a group aiming to standardize a radio communication system. The technical specifications of the LTE have been specified as 3GPP Release 8, and Release 9, which is an upgrade version of Release 8, and an LTE Advanced, which is a sophisticated version of the LTE, have been currently considered.

Furthermore, in the Release 9, detailed functions and requirements of a low power base station (Home eNodeB) have been standardized, which has small transmission output, forms a cell (a small cell) being a communication area having a radius of about several [m] to about several tens of [m], and which is a small base station installable in a room. The low power base station is installed in order to distribute traffic of a high power base station (Macro eNodeB), which has transmission output larger than transmission output of the low power base station and forms a cell (a large cell) being a communication area having a radius of about several hundred [m], or to cover a dead zone in the large cell. The configuration of such a radio communication system is called a heterogeneous network (for example, refer to Non Patent Literature 1).

PRIOR ART DOCUMENT

Non-Patent Document

Non-Patent Document: 3GPP TR25.967, "Home Node B Radio Frequency (RF) Requirements (FDD)", clause 7.2, "Control of HNB downlink interference", March, 2009

SUMMARY OF THE INVENTION

Meanwhile, when a low power base station is installed in the large cell, radio communication between the low power base station and a radio terminal subordinate to the low power base station may cause interference to radio communication between a high power base station and a radio terminal subordinate to the high power base station. Therefore, it is necessary to reduce the interference.

Therefore, the present invention has been achieved in view of the above-described problems, and has an object to provide a low power base station and a communication control method, by which it is possible to appropriately reduce interference to radio communication between a high power base station and a radio terminal subordinate to the high power base station.

To solve the above problem, the present invention has following features. A first feature of the present invention is summarized as a low power base station (low power base station 300), which has transmission output smaller than transmission output of a high power base station (high power base station 100), comprising: a band limitation unit (femto band limitation unit 322) configured to limit a frequency band to be assigned to a radio terminal subordinate to the low power base station, based on propagation loss information indicating propagation loss between the low power base station and the high power base station.

Based on the propagation loss information indicating the propagation loss between the low power base station and the high power base station, the low power base station limits the frequency band to be assigned to the radio terminal subordinate to the low power base station. That is, in consideration of the propagation loss between the low power base station and the high power base station, it is possible for the low power base station to limit the frequency band to be assigned to the radio terminal subordinate to the low power base station, and to appropriately reduce interference to radio communication between the high power base station and a radio terminal subordinate to the high power base station.

A second feature of the present invention is summarized as that the band limitation unit is configured to increases a bandwidth to be subjected to assignment limitation in an uplink frequency band as the propagation loss indicated by the propagation loss information is smaller.

When the propagation loss between the low power base station and the high power base station is small, it is highly probable that the high power base station is interfered by uplink radio communication between the low power base station and the radio terminal subordinate to the low power base station. In this regard, as the propagation loss between the low power base station and the high power base station is smaller, the low power base station increases a bandwidth to be subjected to assignment limitation in the uplink frequency band, so that it is possible to reduce interference to the high power base station from the uplink radio communication between the low power base station and the radio terminal subordinate to the low power base station.

A third feature of the present invention is summarized as that the band limitation unit is configured to increases a bandwidth to be subjected to assignment limitation in a downlink frequency band as the propagation loss indicated by the propagation loss information is larger.

When the propagation loss between the low power base station and the high power base station is large, if a radio terminal subordinate to the high power base station exists in the vicinity of the low power base station, it is highly probable that the radio terminal subordinate to the high power base station is interfered by downlink radio communication between the low power base station and the radio terminal subordinate to the low power base station. In this regard, as the propagation loss between the low power base station and the high power base station is larger, the low power base station increases a bandwidth to be subjected to assignment limitation in the downlink frequency band, so that it is possible to reduce interference to the radio terminal subordinate to the high power base station from the downlink radio communication between the low power base station and the radio terminal subordinate to the low power base station.

A fourth feature of the present invention is summarized as that the propagation loss indicates a difference between transmission power of a predetermined signal transmitted from the high power base station to a radio terminal subordinate to the high power base station and reception power of the predetermined signal in the low power base station.

A fifth feature of the present invention is summarized as a communication control method in a low power base station, which has transmission output smaller than transmission output of a high power base station, comprising: a step of limiting a frequency band to be assigned to a radio terminal subordinate to the low power base station, based on propagation loss information indicating propagation loss between the low power base station and the high power base station.

A sixth feature of the present invention is summarized as a communication control method in a low power base station, which has transmission output smaller than transmission output of a high power base station, comprising: a step (step S103) of limiting a frequency band to be assigned to a radio terminal subordinate to the low power base station, based on propagation loss information indicating propagation loss between the low power base station and the high power base station; and a step of transmitting information indicating limitation of the frequency band to the high power base station using a base station communication means set between the low power base station and the high power base station, when the frequency band is limited.

According to the present invention, it is possible to appropriately reduce interference to radio communication between a high power base station and a radio terminal subordinate to the high power base station.

MODES FOR CARRYING OUT THE INVENTION

Next, an embodiment of the present invention will be described with reference to the drawings. Specifically, the embodiment of the present invention will be described in sequence of (1) Configuration of radio communication system, (2) Operation of low power base station, (3) Operation and effect, and (4) Other embodiments. It is to be noted that the same or similar reference numerals are applied to the same or similar parts through the drawings in the following embodiments.

Figure 1:
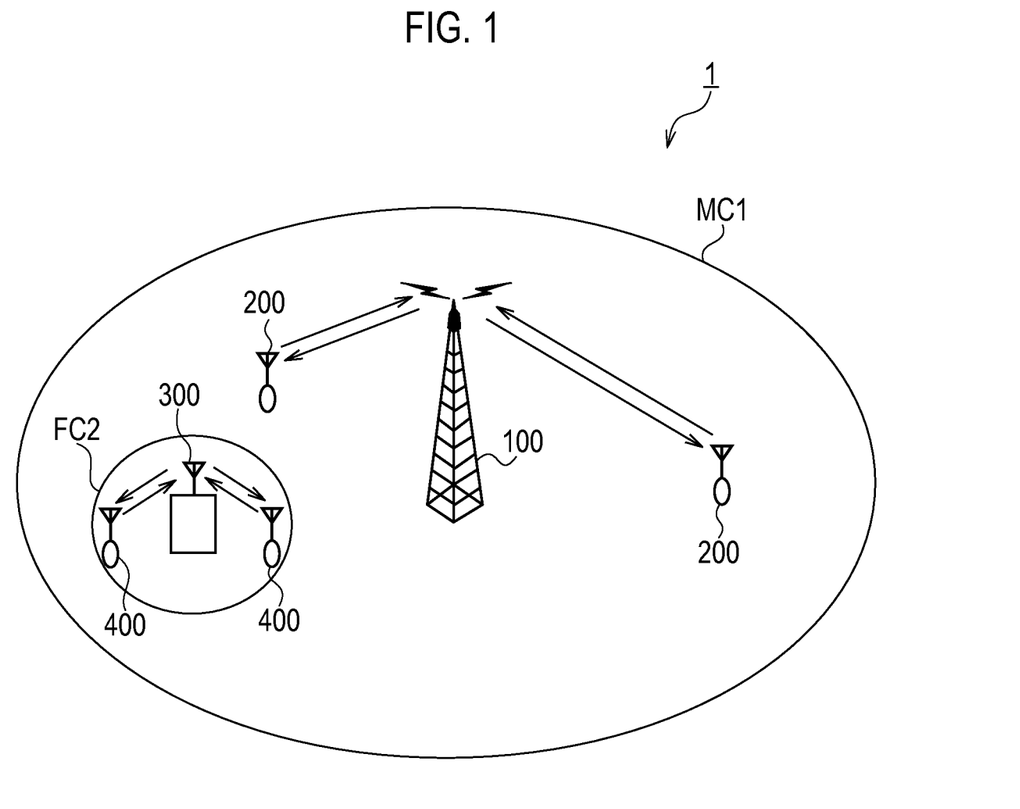
FIG. 1 is a diagram showing the entire schematic configuration diagram of a radio communication system according to an embodiment of the present invention.

(1) Configuration of Radio Communication System
(1.1) Entire Schematic Configuration of Radio Communication System FIG. 1 is a diagram showing the entire schematic configuration of a radio communication system 1 according to an embodiment of the present invention. The radio communication system 1, for example, has a configuration based on the LTE Release 9 which is a 3.9th-generation (3.9G) cellular phone system, or the LTE-Advanced positioned as a 4th-generation (4G) cellular phone system.

As shown in FIG. 1, the radio communication system 1 includes a high power base station (a high output power base station, a large output base station) (for example, a macro cell base station) 100, which forms a large cell (for example, a macro cell) MC1, and a low power base station (a low output power base station, a small output base station) (for example, a femto cell base station: HeNB)) 300, which has transmission power smaller than transmission power of the high power base station 100 and forms a small cell (for example, a femto cell) FC2. A radius of the large cell MC1, for example, is about several hundred [m] and a radius of the small cell FC2, for example, is in the range from about several [m] to about several tens of [m].

In an area subordinate to the high power base station 100, in other words, in the large cell MC1 and outside the small cell FC2, radio terminals 200 exist. It is possible for the high power base station 100 and the radio terminals 200 to perform radio communication with each other. Furthermore, in an area subordinate to the low power base station 300, in other words, in the small cell FC2, radio terminals 400 exist. It is possible for the low power base station 300 and the radio terminals 400 to perform radio communication with each other. Hereinafter, the radio terminals 200 will be referred to as macro terminals 200 and the radio terminals 400 will be referred to as femto terminals 400.

The high power base station 100 is installed at a place based on a cell site design in which a communication provider has considered inter-cell interference. Meanwhile, the low power base station 300 is configured in a small size enough to be installed at an arbitrary place (specifically, in an indoor space) by a user. The low power base station 300 is installed in the large cell MC1 in order to distribute traffic of the high power base station 100, or to cover a dead zone in the large cell MC1.

When a frequency band of a downlink (a link from the high power base station 100 to the macro terminals 200, hereinafter, referred to as a "macro downlink"), which is used in radio communication when the high power base station 100 and the macro terminals 200 are connected to perform the radio communication with each other, overlaps a frequency band of a downlink (a link from the low power base station 300 to the femto terminals 400, hereinafter, referred to as a "femto downlink") used in radio communication when the low power base station 300 and the femto terminals 400 are connected to perform the radio communication with each other, the macro terminals 200 performing the radio communication with the high power base station 100 are interfered by a radio signal transmitted from the low power base station 300 to the femto terminals 400 through the femto downlink.

When a frequency band of an uplink (a link from the macro terminals 200 to the high power base station 100, hereinafter, referred to as a "macro uplink"), which is used in radio communication when the high power base station 100 and the macro terminals 200 are connected to perform the radio communication with each other, overlaps a frequency band of an uplink (a link from the femto terminals 400 to the low power base station 300, hereinafter, referred to as a "femto uplink") used in radio communication when the low power base station 300 and the femto terminals 400 are connected to perform the radio communication with each other, the high power base station 100 performing the radio communication with the macro terminals 200 is interfered by a radio signal transmitted from the femto terminals 400 to the low power base station 300 through the femto uplink.

In the present embodiment, the low power base station 300 reduces the interference to the high power base station 100 and the macro terminals 200, in other words, the low power base station 300 reduces the interference to the radio communication between the high power base station 100 and the macro terminals 200 from the radio communication between the low power base station 300 and the femto terminals 400.

(1.2) Configuration of Low Power Base Station

Figure 2:
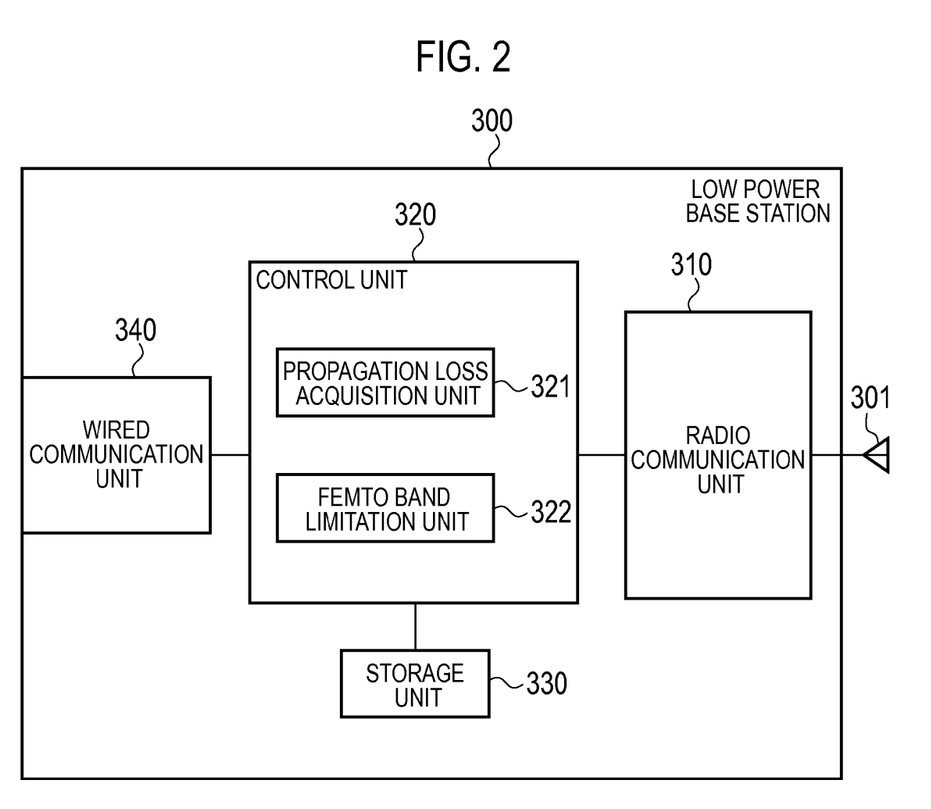
FIG. 2 is a block diagram showing the configuration of a low power base station according to the embodiment of the present invention.

FIG. 2 is a block diagram showing the configuration of the low power base station 300. As shown in FIG. 2, the low power base station 300 includes an antenna unit 301, a radio communication unit 310, a control unit 320, a storage unit 330, and a wired communication unit 340.

The radio communication unit 310, for example, is configured using a radio frequency (RF) circuit, a baseband (BB) circuit and the like, and transmits and receives a radio signal to/from the femto terminal 400 through the antenna unit 301. Furthermore, the radio communication unit 310 encodes and modulates a transmission signal, and demodulates and decodes a reception signal.

Furthermore, when the high power base station 100 and the macro terminals 200 are connected to perform radio communication with each other using the macro downlink, the radio communication unit 310 receives a radio signal from the high power base station 100.

The control unit 320, for example, is configured using a CPU (Central Processing Unit), a DSP (Digital Signal Processor) and the like, and controls various functions of the low power base station 300.

The storage unit 330, for example, is configured using a memory, and stores various types of information used for the control and the like of the low power base station 300.

The wired communication unit 340 communicates with a communication apparatus connected to an exterior of the low power base station 300 through a wired communication network (a backhaul line) (not shown). In addition, the wired communication unit 340 is also available for communication between the low power base station 300 and the high power base station 100. In this case, the low power base station 300 sets a logical communication path between the low power base station 300 and the high power base station 100 through the wired communication unit 340, and directly transmits information to the high power base station 100 through the logical communication path. Furthermore, in this case, the low power base station 300 receives information from the high power base station 100 through the logical communication path. Furthermore, the low power base station 300 may constitute a radio communication unit for communication through the backhaul line, instead of the wired communication unit 340.

The control unit 320 includes a propagation loss acquisition unit 321 and a femto band limitation unit 322.

The propagation loss acquisition unit 321 acquires propagation loss information indicating propagation loss between the low power base station 300 and the high power base station 100. Here, the propagation loss includes distance attenuation, shadowing loss, and feature pass loss.

Specifically, the propagation loss acquisition unit 321 receives a reference signal, which is transmitted by the high power base station 100 in radio communication using the macro downlink, and a signal including the transmission power of the reference signal, through the antenna unit 301 and the radio communication unit 310. The propagation loss acquisition unit 321 measures the power (reception power) of the received reference signal. Moreover, the propagation loss acquisition unit 321 acquires the difference between the transmission power and the reception power of the reference signal as the propagation loss information.

Based on the propagation loss information acquired by the propagation loss acquisition unit 321, the femto band limitation unit 322 limits a frequency band to be assigned to the femto terminals 400 subordinate to the low power base station 300. Here, limiting the frequency band means that the assignment of the frequency band is prohibited, the assignment of the frequency band is possible but the priority of the assignment is lowered below priority of another frequency band, and the like.

Figure 3:
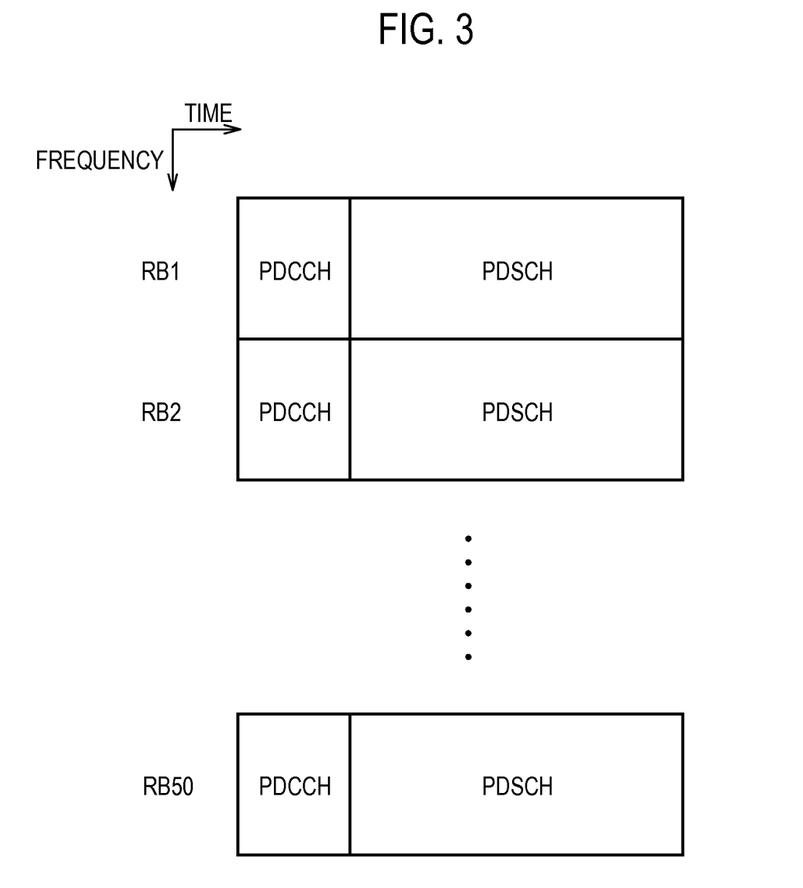
FIG. 3 is a diagram showing an example of a downlink frequency band available to the low power base station according to the embodiment of the present invention.

FIG. 3 is a diagram showing an example of a downlink frequency band available to the low power base station 300. For example, when a downlink frequency bandwidth available to the low power base station 300 is 10 [MHz], the downlink frequency band is divided into 50 resource blocks (RBs) 1 to 50. Each resource block is configured by a control information channel (PDCCH: Physical Downlink Control CHannel) for downlink control information transmission and a shared data channel (PDSCH: Physical Downlink Shared CHannel) for downlink user data transmission.

The PDCCH includes various types of information required for receiving user data included in the PDSCH. Therefore, when it is not possible for the femto terminal 400 to receive the information in the PDCCH, it is not possible to receive the user data in the PDSCH. Accordingly, since the PDCCH is an important radio channel, it is preferable not to limit the assignment of the PDCCH. In the present embodiment, the femto band limitation unit 322 employs the PDSCH as a downlink frequency band (a femto downlink band) to be subjected to assignment limitation, and limits the assignment of the PDSCH.

Figure 4:
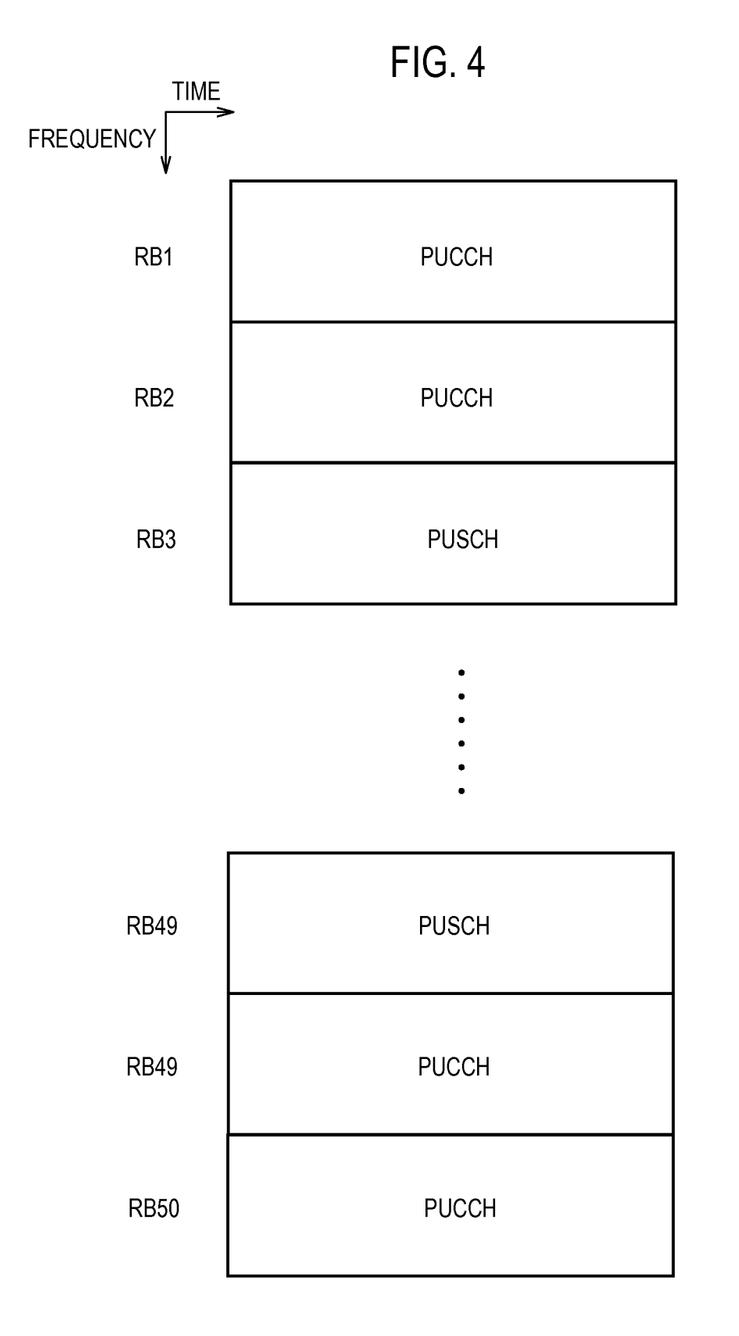
FIG. 4 is a diagram showing an example of an uplink frequency band available to the low power base station according to the embodiment of the present invention.

FIG. 4 is a diagram showing an example of an uplink frequency band available to the low power base station 300. For example, when an uplink frequency bandwidth available to the low power base station 300 is 10 [MHz], the uplink frequency band is divided into 50 resource blocks (RBs) 1 to 50. The resource blocks include control information channel (PUCCH: Physical Uplink Control CHannel) resource blocks for uplink control information transmission, and shared data channel (PUSCH: Physical Uplink Shared CHannel) resource blocks for uplink user data transmission. In the example of FIG. 4, RB1, RB2, RB 49, and RB 50 are the PUCCH and the other resource blocks are the PUSCH. The PUCCH includes various types of information required for receiving user data included in the PDSCH. Therefore, when it is not possible for the low power base station 300 to receive the information in the PUCCH, it is not possible to receive the user data in the PUSCH. Accordingly, since the PUCCH is an important radio channel, it is preferable not to limit the assignment of the PUCCH. In this regard, in the present embodiment, the femto band limitation unit 322 employs the PUSCH as an uplink frequency band (a femto uplink band) to be subjected to assignment limitation, and limits the assignment of the PUSCH.

When the propagation loss between the low power base station 300 and the high power base station 100, which is indicated by the propagation loss information, is small, it is highly probable that the high power base station 100 is interfered by the uplink radio communication between the low power base station 300 and the femto terminal 400.

In this regard, as the propagation loss between the low power base station 300 and the high power base station 100 is smaller, the femto band limitation unit 322 increases a bandwidth to be subjected to assignment limitation in the femto uplink band. That is, as the propagation loss between the low power base station 300 and the high power base station 100 is smaller, the femto band limitation unit 322 increases the number of uplink resource blocks corresponding to the PUSCH to be subjected to the assignment limitation.

Meanwhile, when the propagation loss between the low power base station 300 and the high power base station 100, which is indicated by the propagation loss information, is large, if the macro terminal 200 exists in the vicinity of the low power base station 300, it is highly probable that the macro terminal 200 is interfered by the downlink radio communication between the low power base station 300 and the femto terminal 400 in the state in which the reception power of the macro terminal 200 for a radio signal from the high power base station 100 is small.

In this regard, as the propagation loss between the low power base station 300 and the high power base station 100 is larger, the femto band limitation unit 322 increases a bandwidth to be subjected to assignment limitation in the femto downlink band. That is, as the propagation loss between the low power base station 300 and the high power base station 100 is larger, the femto band limitation unit 322 increases the number of downlink resource blocks corresponding to the PDSCH to be subjected to the assignment limitation.

The femto band limitation unit 322 limits the assignment of a frequency band corresponding to an uplink limitation bandwidth which is a bandwidth to be subjected to the assignment limitation in the femto uplink band. The femto band limitation unit 322 limits the assignment of a frequency band corresponding to a downlink limitation bandwidth which is a bandwidth to be subjected to the assignment limitation in the femto downlink band.

Then, the control unit 320 assigns the PUSCH and the PDSCH to the femto terminal 400 in consideration of a resource block subjected to the assignment limitation.

(2) Operation of Low Power Base Station

Figure 5:
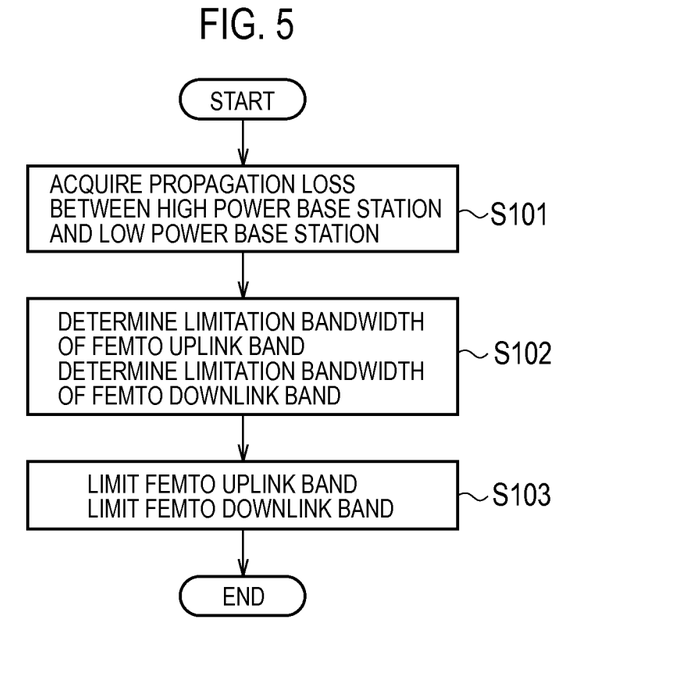
FIG. 5 is a flowchart showing an operation example of the low power base station according to the embodiment of the present invention.

Next, the operation of the low power base station 300 will be described. FIG. 5 is a flowchart showing an operation example of the low power base station 300 according to the embodiment of the present invention.

In step S101, the propagation loss acquisition unit 321 of the control unit 320 acquires propagation loss between the high power base station 100 and the low power base station 300.

In step S102, based on the propagation loss between the high power base station 100 and the low power base station 300, the femto band limitation unit 322 of the control unit 320 determines a bandwidth (an uplink limitation bandwidth) to be subjected to assignment limitation in the femto uplink band and a bandwidth (a downlink limitation bandwidth) to be subjected to assignment limitation in the femto downlink band.

In step S103, the femto band limitation unit 322 of the control unit 320 limits the assignment of a frequency band of the femto uplink band, which corresponds to the uplink limitation bandwidth, and limits the assignment of a frequency band of the femto downlink band, which corresponds to the downlink limitation bandwidth.

(3) Operation and Effect

Based on the propagation loss information indicating the propagation loss between the low power base station 300 and the high power base station 100, the low power base station 300 in the present embodiment limits a frequency band to be assigned to the femto terminal 400 subordinate to the low power base station 300. Specifically, the low power base station 300 increases a bandwidth to be subjected to assignment limitation in the femto uplink band as the propagation loss between the low power base station 300 and the high power base station 100 is smaller, and increases a bandwidth to be subjected to assignment limitation in the femto downlink band as the propagation loss between the low power base station 300 and the high power base station 100 is larger.

As described above, in consideration of the propagation loss between the high power base station 100 and the low power base station 300, it is possible for the low power base station 300 to limit the frequency band to be assigned to the femto terminal 400 subordinate to the low power base station 300, and to appropriately reduce interference to the radio communication between the high power base station 100 and the macro terminal 200 subordinate to the high power base station 100.

(4) Other Embodiments

As described above, the present invention has been described with the embodiments. However, it should not be understood that those descriptions and drawings constituting a part of the present disclosure limit the present invention. Further, various substitutions, examples, or operational techniques shall be apparent to a person skilled in the art based on this disclosure.

In the embodiment, in consideration of the propagation loss between the low power base station 300 and the high power base station 100, the low power base station 300 limits the frequency band to be assigned to the femto terminal 400 subordinate to the low power base station 300. However, in consideration of the presence of the macro terminals 200, the low power base station 300 may limit the frequency band to be assigned to the femto terminal 400 subordinate to the low power base station 300.

In this case, the control unit 320 of the low power base station 300 detects the macro terminals 200. Specifically, the control unit 320 detects a macro terminal 200, which exists in the vicinity of the low power base station 300 and may be interfered by the low power base station 300, among the macro terminals 200.

Examples of techniques for detecting the macro terminals 200 include the following first and second detection techniques. In the first detection technique, the control unit 320 measures interference amounts in respective frequencies in an entire frequency band of the femto uplink. Here, the interference amounts are measured by received intensity of signals from terminals other than the femto terminals 400. Next, when a frequency band, in which the interference amount is equal to or higher than a first predetermined value, exists in the entire frequency band of the femto uplink, the control unit 320 determines that the macro terminals 200 exist.

Furthermore, in the second detection technique, the control unit 320 specifies a radio signal, which includes a pattern of a reference signal other than a pattern of a reference signal from the femto terminal 400 subordinate to the low power base station 300, among radio signals of the frequency band of the femto uplink received in the radio communication unit 310. Here, the pattern of the reference signal from the femto terminal 400 has been determined in advance and is recognizable by the control unit 320. Next, the control unit 320 measures received electric field intensity (RSRP) of the radio signal including the pattern of the reference signal other than the pattern of the reference signal from the femto terminal 400, and determines that the macro terminals 200 exist when the received electric field intensity (RSRP) is equal to or higher than a second predetermined value determined in advance. In addition, the detection technique of the macro terminals 200 is not limited to the aforementioned first and second detection techniques.

When the macro terminals 200 are detected by the aforementioned detection techniques, the femto band limitation unit 322 limits the frequency band to be assigned to the femto terminal 400 subordinate to the low power base station 300 based on the propagation loss information acquired by the propagation loss acquisition unit 321.

After the frequency band to be assigned to the femto terminal 400 is limited, when the macro terminals 200 are not detected, the femto band limitation unit 322 releases the limitation of the frequency band to be assigned to the femto terminal 400.

In the embodiment, there has been described a case in which the high power base station 100 is a macro cell base station that forms a macro cell and the low power base station 300 is a femto cell base station that forms a femto cell. However, the high power base station 100 and the low power base station 300 are not limited thereto. That is, it is sufficient if the transmission power of the low power base station 300 is smaller than the transmission power of the high power base station 100. For example, when the high power base station 100 is a macro cell base station that forms a macro cell, the low power base station 300 may be a base station that forms a micro cell or a pico cell. Furthermore, when the high power base station 100 is a micro cell base station that forms a micro cell, the low power base station 300 may be a base station that forms a pico cell or a femto cell. Moreover, when the high power base station 100 is a pico cell base station that forms a pico cell, the low power base station 300 may be a base station that forms a femto cell.

Furthermore, in the embodiment, in consideration of the propagation loss between the low power base station 300 and the high power base station 100, the low power base station 300 limits the frequency band to be assigned to the femto terminal 400 subordinate to the low power base station 300. However, when the low power base station 300 has performed this limitation, the low power base station 300 may transmit information indicating the limitation of the frequency band to the high power base station 100. Specifically, the low power base station 300 may transmit information (including a number corresponding to a resource block or identification information), which indicates a frequency band assigned to the femto terminal 400 subordinate to the low power base station 300, or information (including a number corresponding to a resource block or identification information), which indicates a frequency band subjected to limitation of assignment to the femto terminal 400 subordinate to the low power base station 300, to the high power base station 100 through the wired communication unit 340 via a logical communication path set between the low power base station 300 and the high power base station 100. In this case, when the information indicating the limitation of the frequency band is received from the low power base station 300, the high power base station 100 uses the information indicating the limitation of the frequency band in assigning a radio resource (including transmission power control) of at least one of a downlink and an uplink in the high power base station 100. In this case, it is possible for the low power base station 300 to more appropriately reduce interference to the radio communication between the high power base station 100 and the macro terminal 200 subordinate to the high power base station 100.

Furthermore, in the embodiment, the radio communication system 1 has a configuration based on the LTE Release 9 or the LTE-Advanced. However, a configurations based on another communication standard may also be adopted.

Thus, it must be understood that the present invention includes various embodiments that are not described herein. Therefore, the present invention is limited only by the specific features of the invention in the scope of the claims reasonably evident from the disclosure above.

In addition, the entire content of Japanese Patent Application No. 2010-074955 (filed on Mar. 29, 2010) is incorporated in the present specification by reference.

INDUSTRIAL APPLICABILIBITY

The low power base station and the communication control method of the present invention are applicable to a low power base station and a communication control method, by which it is possible to appropriately reduce interference to radio communication between a high power base station and a radio terminal subordinate to the high power base station.

The invention claimed is:

1. A low power base station, which has transmission output smaller than transmission output of a high power base station, comprising:
a band limitation unit configured to limit a frequency band to be assigned to a radio terminal subordinate to the low power base station, based on propagation loss information indicating propagation loss between the low power base station and the high power base station,
wherein the band limitation unit is configured to increase a bandwidth to be subjected to assignment limitation in an uplink frequency band as the propagation loss indicated by the propagation loss information is smaller, and
wherein, the band limitation unit limits assignment of resource blocks for uplink user data transmission, but does not limit assignment of resource blocks for uplink control information, such that when it is not possible for the low power base station to receive uplink control information, it is not possible for the low power base station to receive uplink user data.

2. The low power base station according to claim 1, wherein
the band limitation unit is configured to increases a bandwidth to be subjected to assignment limitation in a downlink frequency band as the propagation loss indicated by the propagation loss information is larger.

3. The low power base station according to claim 1, wherein
the propagation loss indicates a difference between transmission power of a predetermined signal transmitted from the high power base station to a radio terminal subordinate to the high power base station and reception power of the predetermined signal in the low power base station.

4. A communication control method in a low power base station, which has transmission output smaller than transmission output of a high power base station, comprising:
a step of limiting a frequency band to be assigned to a radio terminal subordinate to the low power base station, based on propagation loss information indicating propagation loss between the low power base station and the high power base station,
wherein in the step of limiting, a bandwidth to be subjected to assignment limitation in an uplink frequency band is increased as the propagation loss indicated by the propagation loss information is smaller, and
wherein, in the step of limiting, assignment of resource blocks for uplink user data transmission is limited, but assignment of resource blocks for uplink control information is not limited, such that when it is not possible for the low power base station to receive uplink control information, it is not possible for the low power base station to receive uplink user data.

5. A communication control method in a low power base station, which has transmission output smaller than transmission output of a high power base station, comprising:
a step of limiting a frequency band to be assigned to a radio terminal subordinate to the low power base station, based on propagation loss information indicating propagation loss between the low power base station and the high power base station; and
a step of transmitting information indicating limitation of the frequency band to the high power base station using a base station communication means set between the low power base station and the high power base station, when the frequency band is limited, wherein in the step of limiting, a bandwidth to be subjected to assignment limitation in an uplink frequency band is increased as the propagation loss indicated by the propagation loss information is smaller, and wherein, in the step of limiting, assignment of resource blocks for uplink user data transmission is limited, but assignment of resource blocks for uplink control information is not limited, such that when it is not possible for the low power base station to receive uplink control information, it is not possible for the low power base station to receive uplink user data.

\* \* \* \* \*